United States Patent
Arai et al.

(10) Patent No.: US 7,345,713 B2
(45) Date of Patent: Mar. 18, 2008

(54) VIDEO DISPLAY APPARATUS FOR CORRECTING LUMINANCE DIFFERENCE BETWEEN DISPLAY PIXELS

(75) Inventors: Takayuki Arai, Fukaya (JP); Tsutomu Sakamoto, Fukaya (JP); Masao Yanamoto, Fukaya (JP); Toshio Obayashi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 558 days.

(21) Appl. No.: 11/028,503

(22) Filed: Jan. 4, 2005

(65) Prior Publication Data
US 2005/0151883 A1 Jul. 14, 2005

(30) Foreign Application Priority Data
Jan. 9, 2004 (JP) ............................. 2004-004782

(51) Int. Cl.
*H04N 5/57* (2006.01)
*H04N 5/14* (2006.01)
*G09G 5/02* (2006.01)

(52) U.S. Cl. ..................... 348/687; 348/672; 348/679; 348/790; 345/600; 345/63

(58) Field of Classification Search ........ 348/672–675, 348/678, 679, 687, 790, 791, 795–803; 345/589, 345/593, 600–605, 63, 77, 78
See application file for complete search history.

(56) References Cited

U.S. PATENT DOCUMENTS 4,897,639 A * 1/1990 Kanayama ................... 345/82
5,227,863 A * 7/1993 Bilbrey et al. .............. 348/578
5,359,342 A * 10/1994 Nakai et al. .................. 345/89
6,020,868 A * 2/2000 Greene et al. ................ 345/88
6,396,508 B1 * 5/2002 Noecker ..................... 345/693
2001/0026283 A1 * 10/2001 Yoshida et al. ............. 345/600
2003/0095085 A1 * 5/2003 Abe .......................... 345/74.1

FOREIGN PATENT DOCUMENTS

JP   2001-075542   3/2001
JP   2004-157309   6/2004

* cited by examiner

*Primary Examiner*—Victor R. Kostak
(74) *Attorney, Agent, or Firm*—Pillsbury Winthrop Shaw Pittman, LLP

(57) ABSTRACT

An analog-to-digital converter converts a video signal into a digital video signal consisting of N bits and outputs the converted signal. A correction value memory stores correction data consisting of M bits which is used to correct the difference in luminance between display pixels on a display. A multiplier multiplies the video signal consisting of N bits output from the analog-to-digital converter by the correction data consisting of M bits stored in the correction value memory, and outputs a video signal consisting of L bits with which the difference in luminance between display pixels on the display is corrected.

5 Claims, 5 Drawing Sheets

VIDEO DISPLAY APPARATUS FOR CORRECTING LUMINANCE DIFFERENCE BETWEEN DISPLAY PIXELS

CROSS-REFERENCE TO RELATED APPLICATIONS

This application is based upon and claims the benefit of priority from prior Japanese Patent Application No. 2004-004782, filed Jan. 9, 2004, the entire contents of which are incorporated herein by reference.

BACKGROUND OF THE INVENTION

1. Field of the Invention

The present invention relates to a video display apparatus, and more particularly to a video display apparatus which corrects irregularities in luminance for each pixel generated in a planar display or the like.

2. Description of the Related Art

In a video display apparatus having a plurality of light emitting elements, there is a problem that irregularities in luminance, color or the like are generated due to irregularities in luminance characteristics between the respective light emitting elements. In order to solve this problem, such a technique as described in Jpn. Pat. Appln. KOKAI Publication No. 2001-75542 is disclosed.

In the above-described reference, a video displayed in a display apparatus is imaged by a camera, the video signal is subjected to analog-to-digital conversion, the converted signal is further processed into correction information, the correction information is written in a non-volatile memory, and the video signal to be displayed in the display apparatus is corrected by using the written correction information.

When irregularities in luminance characteristics between the respective light emitting elements are corrected by using such a technique as disclosed in Jpn. Pat. Appln. KOKAI Publication No. 2001-75542, irregularities in luminance of the display is suppressed, whereas there occurs a problem such as a reduction in luminance or a reduction in contrast. When the degree of irregularities in luminance of the display is large in particular, the problem of a reduction in luminance or a reduction in contrast is serious.

BRIEF SUMMARY OF THE INVENTION

According to an embodiment of the present invention, there is provided A video display apparatus which displays a video image based on a video signal in a video display portion comprising a plurality of pixels, comprising:
- a video signal conversion portion which converts the video signal into a digital video signal consisting of N bits (N is an integer) and outputs the converted signal;
- a correction data storage portion which stores correction data consisting of M bits (M is an integer) with respect to a pixel having a light emission luminance exceeding a predetermined threshold value in the video display portion; and
- a video signal output portion which outputs a video signal consisting of L bits (L is an integer) with which a difference in characteristics between display pixels in the video display portion is corrected, based on the video signal consisting of N bits output from the video signal conversion portion and the correction data consisting of M bits stored in the correction data storage portion.

Irregularities in luminance of the display are corrected while suppressing a reduction in performances, such as a reduction in luminance or a reduction in contrast, of the display as much as possible.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the accompanying drawings.

EMBODIMENT 1

Figure 1:
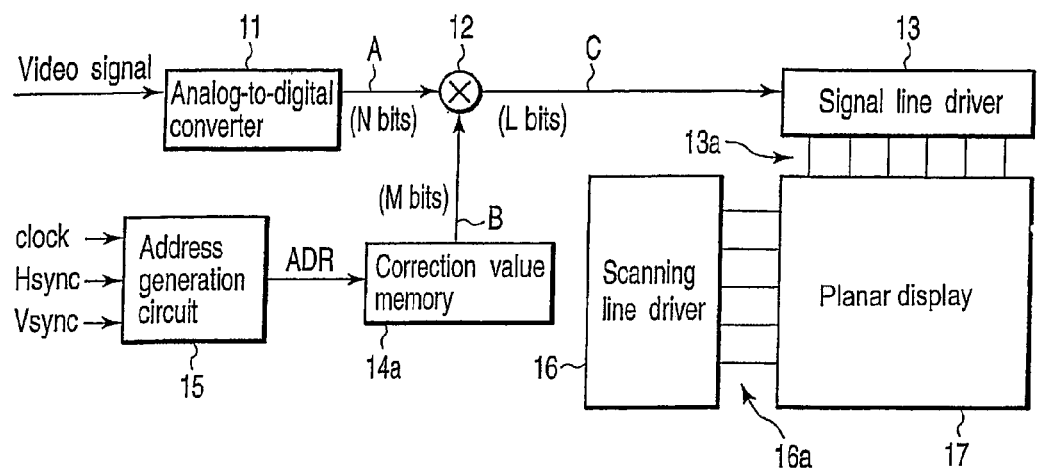
FIG. 1 is a block diagram illustrating a video display apparatus according to a first embodiment of the present invention.

FIG. 1 is a block diagram illustrating a video display apparatus according to the first embodiment of the present invention.

Reference numeral 11 denotes an analog-to-digital converter; reference numeral 12, a multiplier; reference numeral 13, a signal line drive circuit; reference numeral 14a, a correction value memory; reference numeral 15, an address generation circuit; reference numeral 16, a scanning line drive circuit; and reference numeral 17, a planar display. It is to be noted that a field emission display (FED), an electroluminescent display, a liquid crystal, a plasma display or the like is used as the planar display 17. A video image is displayed in this planar display 17 based on a video signal subjected to processing described below. Further, the analog-to-digital converter 11 is a converter which converts an analog signal into a digital signal, and comprises a semiconductor IC or the like.

When a broadcast signal is received through a non-illustrated broadcast receiving device (a tuner), a video signal is demodulated. This demodulated video signal is converted into a video signal having an analog RGB format (an analog RGB video signal) by predetermined processing and input to the analog-to-digital converter 11. The analog-to-digital converter 11 converts the input analog RGB video signal into digital video data A composed of N bits and outputs this data to the multiplier 12. That is, the analog-to-digital converter 11 is an video signal conversion processing portion which converts the analog RGB video signal into the digital video data A composed of N bits.

It is to be noted that the apparatus can be configured in such a manner that a digital video signal having an arbitrary bit number is input to the video signal conversion processing portion. In such a case, the input digital signal is converted into digital video data A composed of N bits and output.

Irregularities in luminance of respective display pixels in the planar display 17 are previously measured by using an imaging device or the like. The correction value memory 14a stores data (correction data) which is used to correct the irregularities in luminance of the display pixels in the planar display 17. Correction data B output from the correction value memory 14a is digital data composed of M bits. As to the correction data, a display screen of, e.g., raster white (when all the display pixels are driven with each data of R, G and B being determined as a maximum value) is imaged by using a CCD camera or the like, a luminance distribution is measured, and the correction data is determined in accordance with each display luminance distribution.

A clock signal (clock), a horizontal synchronization signal (Hsync) and a vertical synchronization signal (Vsync) are input to the address generation circuit 15 from a non-illustrated timing generation circuit. The address generation circuit 15 outputs an address signal ADR based on the signal clock, the signal Hsync and the signal Vsync. This address signal ADR is an address which is used to read a correction value stored in the correction value memory 14a, and corresponds to an address of a display pixel on the planar display 17. The video data A is corrected based on the correction data B read from the correction value memory 14a. That is, the video data of a corresponding pixel on the planar display 17 is corrected by using the correction data B.

The multiplier 12 multiplies the digital video data A consisting of N bits output from the analog-to-digital converter 11 by the correction data B consisting of M bits output from the correction value memory 14a, and outputs the most significant L-bit data which is a result of the multiplication as video data C. That is, the multiplier 12 outputs the digital video data C consisting of L bits with which a difference in luminance characteristics between the display pixels in the planar display is corrected. The digital video data C consisting of L bits output from the multiplier 12 is input to the signal line drive circuit 13.

The signal line drive circuit 13 receives the video data C with which a difference in the luminance characteristics between the display pixels is corrected, and provides a display pixel drive voltage which is required to perform gradation display to the planar display 17 in a one-scanning-line unit. In the planar display 17, switching elements and display pixels are provided in the vicinity of each intersection of a plurality of signal lines 13a and a plurality of scanning lines 16a.

The scanning line drive circuit 16 sequentially supplies ON signals to the switching elements corresponding to one scanning line of the planar display 17 from the top scanning line in accordance with each horizontal scanning period. As a result, a drive voltage (a video signal) in the one-scanning-line unit from the signal line drive circuit 13 is sequentially supplied to pixels corresponding to one scanning line of the planar display 17 from the top scanning line. In this manner, the planar display 17 displays a video image corresponding to the video data C input to the signal line drive circuit 13.

The correction data will now be described.

Figure 2:
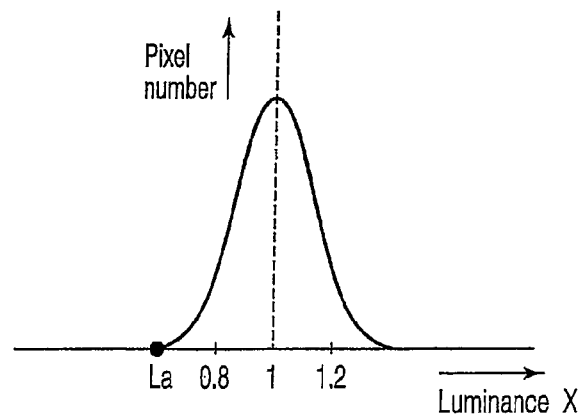
FIG. 2 is a view schematically showing irregularities in luminance of each general pixel in a planar display 17.

FIG. 2 is a view schematically showing irregularities in luminance for pixels in a general planar display 17.

In this example, it is assumed that a luminance distribution of the planar display 17 when a video signal having the same gradation value of R, G and B (which is so-called raster white) is input is a distribution shown in FIG. 2. That is, a horizontal axis represents a luminance, and an average luminance of all pixels is illustrated as 1.0. Furthermore, a vertical axis represents the number of pixels in the planar display 17 which are turned on with a luminance x (a luminance value represented by the horizontal axis).

In order to reduce irregularities in luminance of the planar display 17, the video data A is corrected in this embodiment. That is, in cases where irregularities in luminance are generated when the video signal having the same gradation value of R, G and B of, e.g., raster white is input to the planar display 17, the video data A is corrected so that a pixel having a high luminance is displayed with the same luminance as a pixel having a low luminance. Specifically, each of R, G and B signals of the video data A is multiplied by the correction data B which is required to reduce the gradation value with respect to a pixel having a high luminance.

For example, in FIG. 2, correction can be performed by multiplying each of R, G and B signals of the video data A by the correction data which is required to reduce the gradation value with respect to a pixel having a luminance higher than a target luminance La so that all pixels having the luminance higher than the luminance La can be displayed with the luminance La. As will be described later, the target luminance La can be appropriately set in accordance with each display. If the target luminance is set to, e.g., 0.8 the correction is carried out so that a display pixel having a luminance higher than 0.8 can be displayed with the luminance 0.8.

An operation of the multiplier 12 will now be described taking L=M=N=10 (bits) as an example. In this case, the multiplier 12 multiplies the video data A consisting of 10 bits by the correction data B consisting of 10 bits, and outputs the most significant 10 bits corresponding to a result of the multiplication as video data C. That is, the multiplier 12 multiplies the video data A consisting of 10 bits by the correction data B consisting of 10 bits, and divides the multiplication result by 2 to the 10th power (=1024).

Figure 3:
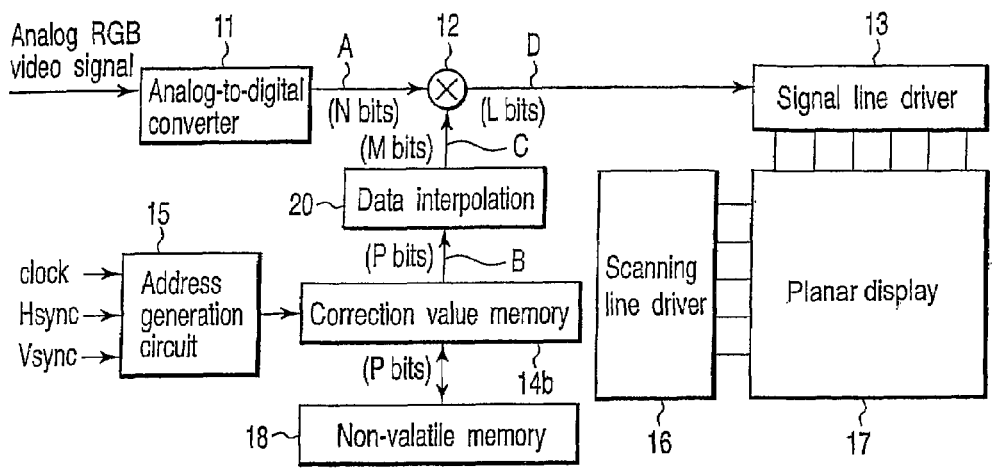
FIG. 3 is a block diagram showing a structure obtained by further concretizing the first embodiment according to the present invention.

A further concrete embodiment according to this embodiment will now be described with reference to FIG. 3. As compared with FIG. 1, in the embodiment shown in FIG. 3, a non-volatile memory 18 and a data interpolation portion 20 are additionally provided.

The correction value memory 14b comprises a semiconductor memory such as a DRAM or an SRAM, and this is a non-volatile memory which cannot keep data stored therein for a long time when a power is not supplied thereto (when the power supply is turned off). The non-volatile memory 16 comprises a semiconductor memory such as an EEPROM, and can keep data stored therein even when a power is not supplied thereto.

Whether the power is supplied to the correction value memory 14b can be detected by a non-illustrated CPU. When turning off the power supply of the display apparatus (with respect to the correction value memory 14b) is instructed by a user through a non-illustrated operation portion, the CPU transfers correction data stored in the correction value memory 14b from the correction value memory 14b to the non-volatile memory 18. Moreover, when turning on the power supply of the display apparatus (with respect to the correction value memory 14b), the CPU transfers correction data stored in the non-volatile memory 18 from the non-volatile memory 18 to the correction value memory 14b.

Correction data B consisting of P bits (the bit number is P) stored in the correction value memory 14b is input to the data interpolation portion 20. The data interpolation portion 20 converts the input correction data B consisting of P bits into interpolation data C consisting of M bits whose bit number is larger than P, and outputs the converted data. The interpolation data C consisting of M bits output from the data interpolation portion 20 is input to the multiplier 12. The multiplier 12 multiplies N-bit data (video data A) supplied from the analog-to-digital converter 11 by the M-bit data (interpolation data C) fed from the data interpolation portion 20, and outputs the most significant L bits which is a result of the multiplication as video data D.

Interpolation processing of the correction data in the data interpolation portion 20 will now be more concretely described hereinafter. Here, a description will be given on an example where the video data A consists of 10 bits, the correction data B consists of four bits, the interpolation data C consists of 10 bits and the video data D consists of 10 bits. The correction data stored in the non-volatile memory 18 consists of four bits like the correction data B. Therefore, the non-volatile memory 18 stores the data whose bit number is smaller than 10 bits of the video data A.

FIG. 4 is a view illustrating the interpolation processing of the correction data.

Figures 4A, 4B:
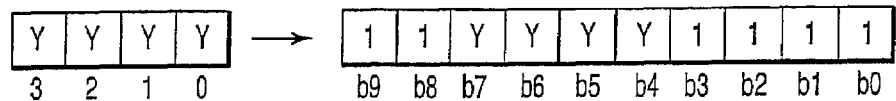
FIG. 4A and 4B are views illustrating interpolation processing of correction data.

It is assumed that the correction data B consisting of four bits output from the correction value memory 14b is represented by binary digits YYYY as shown in FIG. 4A. YYYY shown in FIG. 4B represents the correction data B consisting of four bits which is input to the data interpolation portion 20. That is, FIG. 4 shows the processing which assigns the correction data B consisting of four bits to predetermined bits in the data consisting of 10 bits in the data interpolation portion 20. In this example, the correction data B is assigned to the predetermined bits (b(bit)4 to b7) in the 10-bit data, and bits (b0 to b3, b8 and b9) other than the predetermined bits are determined as 1, thereby creating the interpolation data C consisting of 10 bits.

As described in conjunction with FIG. 1, the video data A consisting of 10 bits and the interpolation data C consisting of 10 bits are input to the multiplier 12 and subjected to an arithmetic operation (multiplication). As a result, the video data D which is digital data consisting of 10 bits with which a difference in luminance characteristics between display pixels in the planar display 17 is corrected is output from the multiplier 12. Specifically, the multiplier 12 outputs the most significant 10 bits of an operation result of the above-described arithmetic operation (multiplication) as the video data D.

In this example, giving a description on the above-described arithmetic operation provided that the video data A is A, the interpolation data C is C and the video data D is D, D=A×C/1024 can be represented. That is, since the video data A is data obtained by digitizing the original input video signal (the analog RGB video signal), the video data D is data obtained by multiplying the original input video signal (the analog RGB video signal) by C/1024 (1024=2 to the 10th power).

Additionally, in this example, when the correction data B output from the correction value memory 14b changes by binary 1, the interpolation data C output from the data interpolation portion 20 varies by decimal 16.

That is, when the correction data B changes by "1" on the decimal base, the original input video signal (the analog RGB video signal) varies by an amount corresponding to 16/1024≈0.016 times. Based on this, it can be understood that the video signal can be corrected in increments of approximately 1.6%. The correction data B has 15 patterns of 0000 to 1110, and the input video signal when the correction data B=1111 is output to the signal line driver 13 as it is. Therefore, the interpolation data C output from the data interpolation portion 20 can take values from 1100001111 to 1111111111. A maximum value of change is (16/1024)×15≈0.234. Therefore, the correction of approximately 23.4% is possible (D≈0.766A).

A correction range and a correction accuracy are determined in accordance with a position of the correction data B indicated by YYYY in FIG. 4B. For example, when the correction data B is assigned to b5 to b8 in the 10-bit data (when the data is shifted to the left side by one bit), the correction range becomes approximately double, but the correction accuracy is approximately half. Conversely, when the correction data is shifted to the right side by one bit, the correction range becomes approximately half, but the correction accuracy is approximately double. Further, one or both of the range and the accuracy of correction can be changed by varying the bit number of the correction data. A position and the bit number of the correction data B in the interpolation data C can be set in accordance with characteristics and a use application of the planar display 17.

A capacity of the correction value memory 14b required in this embodiment is 4 (gradations)×1280 (a horizontal direction)×3 (RGB)×720 (a vertical direction)≈11.1 Mbits. When a memory for 10-bit data is used in accordance with the video data A as the correction value memory like a conventional video display apparatus, a capacity of 10 (gradations)×1280×3×720≈27.6 Mbits is required. According to the above-described method, however, since a data quantity of the correction data can be reduced, it is sufficient for the correction value memory that a capacity of 11.1 Mbits is assured. As compared with the conventional correction value memory, therefore, the correction value memory according to this embodiment can reduce a capacity of 27.6−11.1=approximately 16.5 Mbits.

Furthermore, when the power supply of the apparatus is turned off, the correction data B stored in the correction value memory 14b is transferred and stored in the non-volatile memory 18 as described above. At this moment, according to this embodiment, since a data quantity of the correction data B is small, the memory capacity used in the non-volatile memory 18 can be likewise reduced.

When reduction quantities of the memory capacities used in both the correction value memory 14b and the non-volatile memory 18 are added, a capacity of approximately 16.5+approximately 16.5=approximately 33.0 Mbits can be reduced based on the above description.

EMBODIMENT 2

Figure 5:
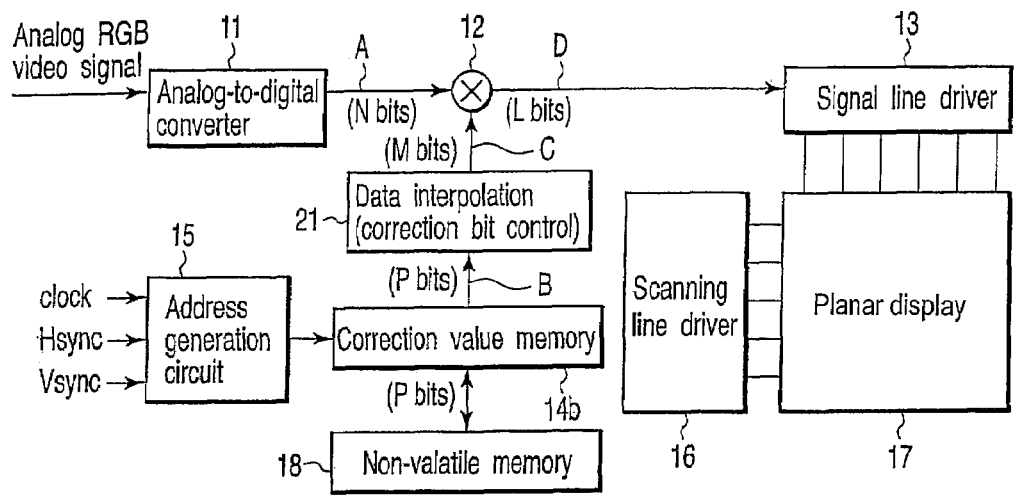
FIG. 5 is a block diagram showing a structure of a second embodiment according to the present invention.

A second embodiment according to the present invention will now be described. FIG. 5 is a block diagram showing a structure of the second embodiment. Like reference numerals denote structures equivalent to those in the foregoing embodiment, thereby eliminating the explanation.

Reference numeral 21 denotes a data interpolation portion according to the second embodiment. The data interpolation portion 21 has a correction bit control portion added to the data interpolation portion 20 in the first embodiment.

The data interpolation portion (the correction bit control portion) 21 outputs from a correction value memory 14*b* data consisting of M bits by using correction data consisting of P bits which is used to correct, especially, the difference in luminance characteristics between display pixels in a planar display.

The data interpolation portion 21 according to the second embodiment "selectively" interpolates the correction data B consisting of P bits output from the correction value memory 14*b* in the data consisting of M bits. That is, the data interpolation portion 21 assigns the correction data B consisting of P bits to predetermined bits in the M-bit data, determines bits to which the correction data is not assigned as 1, creates interpolation data C, and outputs the created data to a multiplier 12.

Concrete processing which selectively interpolates the correction data in the interpolation data will now be described hereinafter provided that video data A output from an analog-to-digital converter 11 consists of 10 bits, correction data B output from the correction value memory 14*b* consists of four bits, interpolation data C output from the data interpolation portion 21 consists of 10 bits and video data D output from the multiplier 12 consists of 10 bits.

FIG. 6 is a view illustrating the selective interpolation processing for the correction data according to this embodiment of the present invention. First, a user uses an operation portion (not shown) of this video display apparatus in order to select a correction mode required to set the precision of the correction. When the correction mode is selected, correction data according to the mode is loaded from the non-volatile memory 18 to the correction value memory 14*b*.

A description will be first given as to an example where a correction mode required to perform the correction with a large (rough) correction range is selected.

Figure 6A:
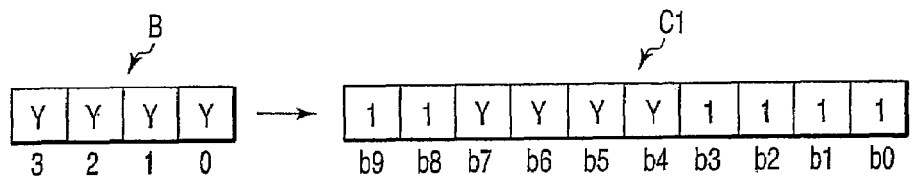
FIG. 6A and 6B are views illustrating selective interpolation processing of correction data according to second embodiment.

FIG. 6A is a view illustrating a state of interpolation of the correction data when the correction mode with a large correction range is selected. Binary numeral YYYY on the left side in FIG. 6A indicates correction data B consisting of four bits input to the data interpolation portion 21. The right side in FIG. 6A indicates interpolation data C1 consisting of 10 bits output from the data interpolation portion 21. The interpolation data C1 is data b0 to b9 consisting of 10 bits.

Since the correction mode with a large correction range is selected in this example, the four-bit correction data is assigned to, e.g., b4 to b7 in the 10-bit data. Furthermore, other six bits to which the correction data B is not assigned are determined as 1. Then, like the first embodiment, the interpolation data C1 (11YYYY111 on the binary base) is output from the data interpolation portion 21.

The interpolation data C1 (11YYYY111) from the data interpolation portion 21 is multiplied by the digital video data A output from the analog-to-digital converter 11 in the multiplier 12. The rough correction can be performed with respect to the digital video data A in increments of approximately 1.6% based on YYYY in the interpolation data C1. In this example, a maximum correctable range is approximately 23.4% (D=0.766A).

It is to be noted that the description has been given as to the example where the four-bit correction data B is assigned to b(bit)4 to b7 in the 10-bit data as an example of the correction mode with a large correction range. As described above, however, when the correction data B is assigned to higher order bits, e.g., b5 to b8, b6 to b9 or the like in the 10-bit data, the correction range becomes larger. Such a range can be used as one of the correction mode alternatives.

An example where a correction mode required to perform correction with a small (fine) correction range is selected will now be described.

Figure 6B:
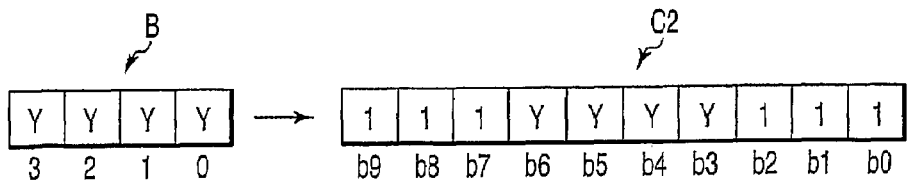

FIG. 6B is a view illustrating a state of interpolation of the correction data when a correction mode with a small correction range is selected. Binary numeral YYYY on the left side of FIG. 6B indicates correction data B consisting of four bits input to the data interpolation portion (the correction bit control portion) 21. The right side of FIG. 6B indicates interpolation data C2 consisting of 10 bits output from the data interpolation portion 21. The interpolation data C2 is data b0 to b9 consisting of 10 bits.

Since the correction mode with a small correction range is selected, the correction data B (binary numeral YYYY) whose bit number is four is assigned to, e.g., bits b3 to b6 in the 10-bit data. Moreover, other bits to which the correction data B is not assigned are determined as 1. Then, the interpolation data C2 (binary numeral 111YYYY111) is output from the data interpolation portion 21.

The interpolation data C2 (binary numeral 111YYYY111) from the data interpolation portion 21 is multiplied by the digital video data A output from the analog-to-digital converter 11 by the multiplier 12. When data in the correction value memory changes by 1, the interpolation data C2 varies by 8 (=2 to the third power) on the decimal base. In this example, 8/1024≈0.008 (approximately 0.8%) is achieved. That is, the correction can be performed with respect to the digital video data A in increments of approximately 0.8%. The correction data B has 15 patterns of 0000 to 1110 and, when the correction data B=1111, the video data A is output from the multiplier 12 as it is. Therefore, the interpolation data C2 output from the data interpolation portion 20 can take values from 1110000111 to 1111111111. Additionally, 8/1024×15≈0.117 (approximately 11.7%) is attained. Therefore, a correction of approximately 11.7% is possible on the maximum level (D=0.883A).

It is to be noted that the description has been given as to the example where the correction data B whose bit number is four is assigned to the bits b3 to b6 in the 10-bit data as an example of the correction mode with a small correction range. As described above, however, when the correction data B is assigned to lower order bits, e.g., b2 to b5, b1 to b4, b0 to b3 or the like in the 10-bit data, the finer correction can be effected, and such a range can be also used as one of the correction mode alternatives.

Here, output data in the correction mode with a large correction range (an output from the data interpolation portion 21: the interpolation data C1) is compared with output data in the correction mode with a small correction range (an output from the data interpolation portion 21: the interpolation data C2).

When the correction mode with a large correction range is selected (in case of the interpolation data C1), a correction range is approximately 23.4% so that a wide luminance range can be corrected. Further, when the correction mode with a small correction range is selected (in case of the interpolation data C2), a minimum correction rate is approximately 0.8% so that the correction can be performed in fine increments. Furthermore, the correction mode with a small correction range can suppress a reduction in luminance as compared with the correction mode with a large correction range.

EMBODIMENT 3

Figure 7:
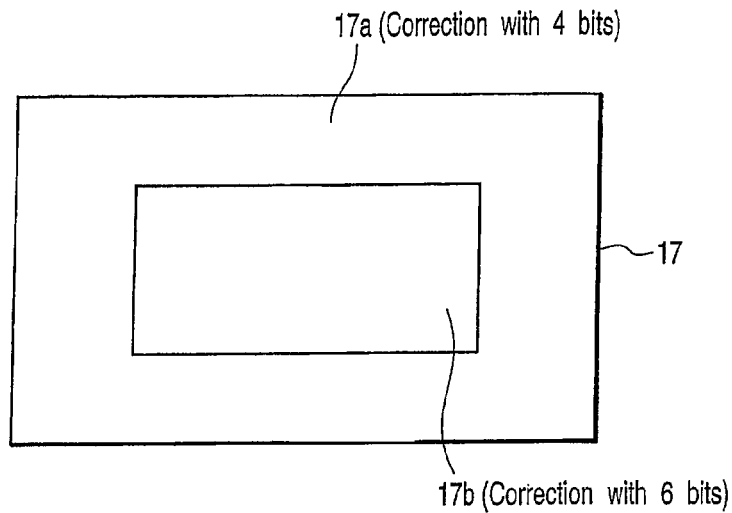
FIG. 7 is a view illustrating a scheme of a third embodiment according to the present invention.

A third embodiment according to the present invention will now be described. FIG. 7 is a view illustrating a scheme of the third embodiment.

In this embodiment, correction data which is used to correct the difference in luminance between display pixels in a planar display 17 is divided into two or more types of data having different bit numbers and stored in the divided state. For example, the sensitivity of the human eye is high at the central portion 17b rather than a peripheral portion 17a of the display 17 (it is sensitive to irregularities in luminance at the central portion). Therefore, the information quantity at the central portion 17b is increased, and the information quantity at the periphery 17a is reduced. For example, correction data at the central portion 17b is determined as data consisting of six bits (a first bit number) and correction data at its periphery 17a is determined as data consisting of four bits (a second bit number), and these sets of data are stored in the correction value memory.

Figure 8:
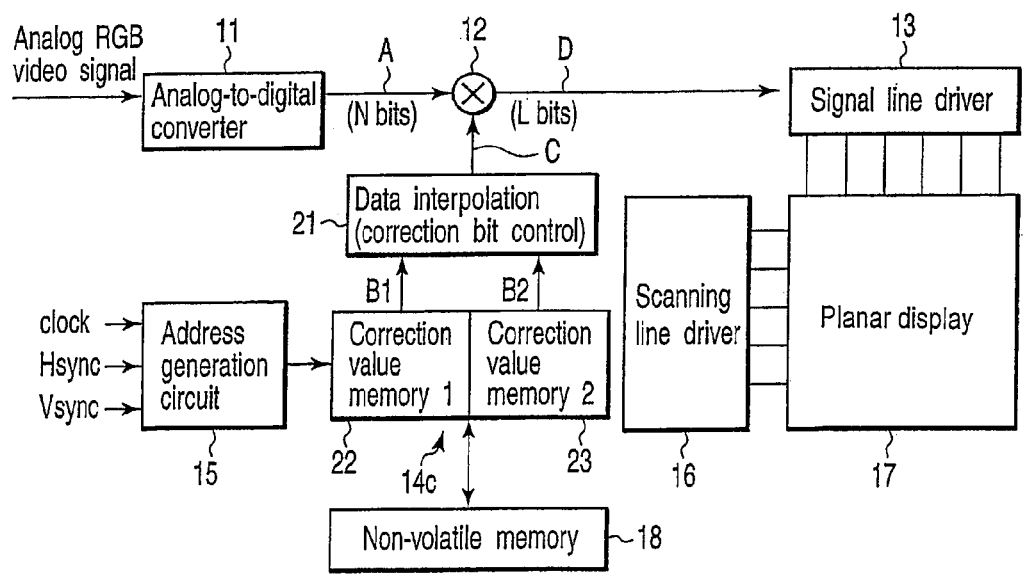
FIG. 8 is a block diagram illustrating the third embodiment according to the present invention.

FIG. 8 is a block diagram illustrating the third embodiment according to the present invention. Like reference numerals denote structures equivalent to those in the first or second embodiment mentioned above, thereby eliminating the explanation.

Reference numeral 14c denotes a correction value memory according to the third embodiment of the present invention. The correction value memory 14c which stores correction data comprises a correction value memory (1) 22 which stores correction data B1 whose bit number is four and a correction value memory (2) 23 which stores correction data B2 whose bit number is six.

The four-bit correction data B1 and the six-bit correction data B2 stored in the correction value memory 14c are supplied to a data interpolation portion 21.

The data interpolation portion 21 interpolates the four-bit correction data B1 or the six-bit correction data B2 supplied thereto in interpolation data C consisting of 10 bits, and outputs the obtained data. The 10-bit interpolation data C output from the data interpolation portion 21 is input to a multiplier 12.

As in the foregoing embodiments, the multiplier 12 subjects digital video data A consisting of 10 bits output from an analog-to-digital converter 11 and the interpolation data C consisting of 10 bits output from the data interpolation portion 20 to arithmetic operation processing, and outputs digital video data D consisting of 10 bits with which the difference in luminance characteristics between display pixels in the planar display is corrected. The 10-bit digital video data D output from the multiplier 12 is input to a signal line drive circuit 13.

According to the third embodiment of the present invention, therefore, optimum correction can be performed by appropriately differentiating the information quantity of the correction data at a predetermined portion from the same at another portion in the planar display 17, and the memory capacity used in the correction value memory 14c can be reduced. Cost can be thereby reduced.

The range and accuracy of the correction will now be described.

Figure 9:
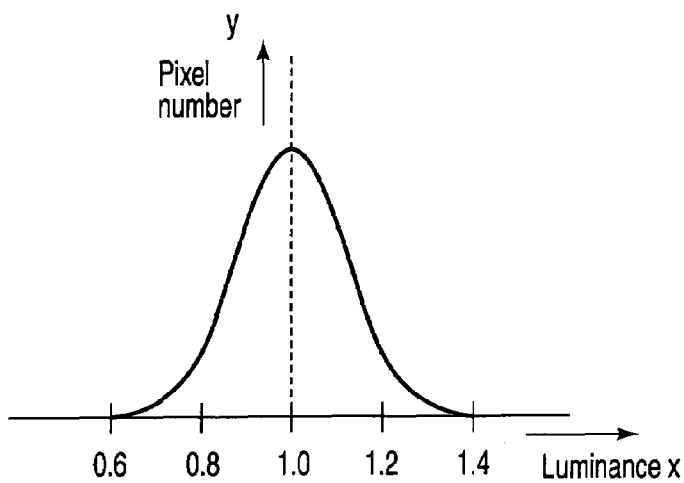
FIG. 9 is a view showing a distribution before correcting pixel irregularities in a planar display.

FIG. 9 schematically shows general irregularities in luminance for pixels in the planar display 17. In this example, it is assumed that a luminance distribution of the planar display 17 obtained when a video signal in which R, G and B of, e.g., raster white have the same gradation value is input has a distribution shown in FIG. 9. In this drawing, the horizontal axis x represents luminance, and an average luminance is 1.0. That is, the luminance x is a value obtained by standardizing the luminance of a pixel by the average luminance. Further, the vertical axis y represents the number of pixels which are turned on with the luminance x in the planar display 17. In this example, in order to suppress irregularities in luminance in the planar display 17, each video data of R, G and B is multiplied by the correction data so that pixels having a high luminance can be displayed with the same luminance as pixels having a low luminance when the video signal of raster white is input.

In FIG. 9, it is assumed that the average luminance of the display when raster white is displayed is 400 cd/m$^2$. In this case, a pixel having a luminance x of, e.g., 0.6 has a luminance of 240 cd/m$^2$ (=400 cd/m$^2$×0.6). When 300 cd/m$^2$ is required for a white peak luminance as a specification of the display, it is assumed that irregularities in luminance are corrected so that pixels having a luminance x higher than 0.6 can have a luminance x of 0.6. In this case, the white peak luminance becomes 240 cd/m$^2$ and hence cannot satisfy the specification.

Figure 10:
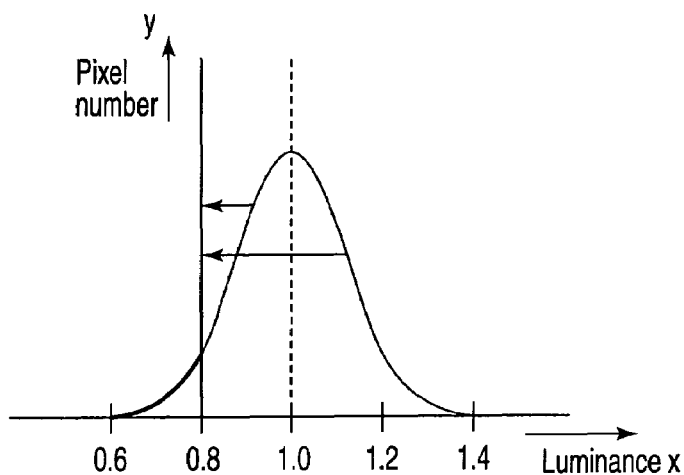
FIG. 10 is a view showing a distribution after correcting pixel irregularities in the planar display.

Thus, assuming that irregularities in luminance are corrected so that pixels alone whose luminance x exceeds a predetermined threshold value (e.g., 0.8) can have a luminance x of 0.8, the distribution after correction is as shown in FIG. 10. In this case, the white peak luminance becomes approximately 320 cd/m$^2$ and hence can satisfy the specification. Pixels having a luminance x of 0.6 to 0.8 are pixels which are out of the irregularity correction range. However, if the number of pixels which are out of the correction range is small and the irregularities visually have no problem, a higher white peak luminance may be visually good in some cases. Furthermore, if many pixels which are out of the correction range (pixels having a luminance x smaller than 0.8) exist at the central portion of the display for example, irregularities in luminance visually become a problem. However, many pixels which are out of the correction range exist at the end portions of the display and the irregularities visually have no problem, a higher white peak luminance may be visually good in some cases.

Figure 11:
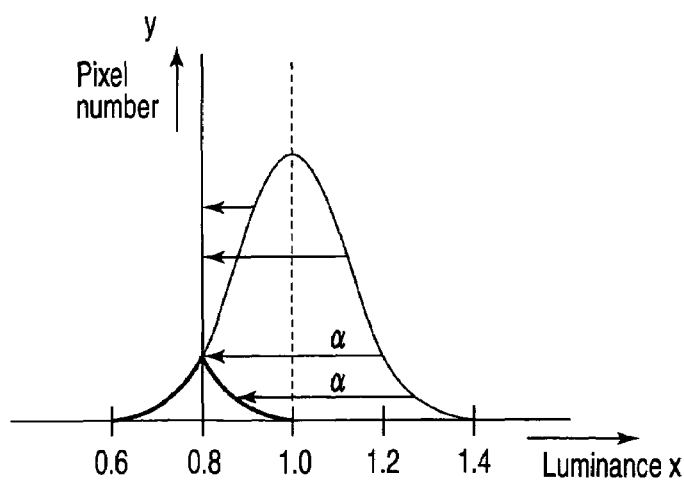
FIG. 11 is a view showing a distribution after correcting pixel irregularities in the planar display.

Moreover, as to pixels relatively having a higher luminance, if the number of such pixels is small or the irregularities visually have no problem, the correction may be carried out as shown in FIG. 11. That is, in the example depicted in FIG. 11, the correction is effected so that pixels having a luminance of 0.8 to 1.2 can have a luminance x of 0.8, and the correction is carried out by a predetermined quantity (α) with respect to pixels having a luminance above 1.2.

Since such a distribution of irregularities in luminance in the planar display as shown in FIG. 9 varies depending on each display, the embodiment according to the present invention determines the optimum luminance correction range while taking irregularities in luminance, average luminance, contrast and other factors inherent to each display into account.

In the foregoing embodiments, as to the correction data of the luminance for each pixel, its correction range, correction accuracy and correction level are appropriately set in accordance with the luminance distribution of each display.

Further, it is often the case that a luminance component displayed on the display 17 is mainly a specific color, e.g., green (G signal). Therefore, assigning more bits of the correction data of the signal G than bits of the correction data of red (R signal) and blue (B signal) can further effectively correct the luminance difference. In this case, as to the correction value memory 14b, the storage capacity for the correction data with respect to the G signal is larger than that of any other color signal. Furthermore, since there is a case that a color signal other than the G signal is the main signal depending on the video image to be displayed, assigning more bits of the correction data of the main color signal than bits of the correction data of any other color signal can suffice.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A video display apparatus which displays a video image based on a video signal in a video display portion comprising a plurality of pixels, comprising:
    a video signal conversion portion which converts the video signal into a digital video signal consisting of N bits (N is an integer) and outputs the converted signal;
    a correction data storage portion which stores correction data consisting of P bits (P is an integer) with respect to a pixel having a light emission luminance exceeding a predetermined threshold value in the video display portion;
    a data interpolation portion which receives the correction data stored in the correction data storage portion, interpolates the correction data in data consisting of M bits (M is an integer), and provides interpolation data; and
    a video signal output portion which outputs a video signal consisting of L bits (L is an integer) with which a difference in characteristics between display pixels in the video display portion is corrected, based on the video signal consisting of N bits output from the video signal conversion portion and the correction data consisting of M bits output from the data interpolation portion,
    wherein the data interpolation portion assigns the correction data consisting of P bits to a selected position in M bit positions of the interpolation data, the selected position determining a range and an accuracy of correction and being set in accordance with characteristics of the video display portion.

2. The video display apparatus according to claim 1, wherein the correction data is data which is used to correct a difference in luminance characteristics between display pixels in the video display portion.

3. The video display apparatus according to claim 1, wherein the bit number M of the correction data is determined as M<N.

4. The video display apparatus according to claim 1, wherein the correction data storage portion includes a first storage portion which stores the correction data for a first area of the video display portion as data having a first bit number, and a second storage portion which stores the correction data for a second area of the video display portion as data having a second bit number smaller than the first bit number.

5. The video display apparatus according to claim 1, wherein the correction data storage portion includes a first storage portion which stores the correction data for a specific color signal in R, G and B signals of the video signal as data having a first bit number, and a second storage portion which stores the correction data for any other color signal as data having a second bit number smaller than the first bit number.

* * * * *